United States Patent
Iijima

(12) 
(10) Patent No.: US 6,748,428 B1
(45) Date of Patent: Jun. 8, 2004

(54) DEVICE OPERATION MANAGEMENT METHOD, A MANAGER DEVICE, A PROGRAM SUPPLY MEDIUM FOR SUPPLYING A DEVICE OPERATION MANAGEMENT PROGRAM, AN CONTROLLER DEVICE, AND AN ELECTRONIC DEVICE

(75) Inventor: Yuko Iijima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/454,764

(22) Filed: Dec. 3, 1999

(30) Foreign Application Priority Data

Dec. 8, 1998 (JP) .......................................... P10-348998

(51) Int. Cl.[7] .......................................... G06F 15/177
(52) U.S. Cl. .......................... 709/220; 709/226; 710/8; 710/305; 370/266; 370/278
(58) Field of Search ................................. 709/220, 321, 709/204, 226, 245, 209, 229, 328, 230, 313, 330, 238; 710/8, 9, 10, 12, 100, 104, 105, 305, 72; 370/216, 432, 257, 259, 437, 278, 260, 263–266, 443, 485

(56) References Cited

U.S. PATENT DOCUMENTS

| 5,421,009 A | * | 5/1995 | Platt | 709/219 |
|---|---|---|---|---|
| 5,602,993 A | * | 2/1997 | Stromberg | 707/511 |
| 5,845,128 A | * | 12/1998 | Noble et al. | 713/1 |
| 6,138,178 A | * | 10/2000 | Watanabe | 710/8 |
| 6,199,136 B1 | * | 3/2001 | Shteyn | 370/260 |
| 6,434,447 B1 | * | 8/2002 | Shteyn | 700/245 |

OTHER PUBLICATIONS

"Specification of the Home Audio/Video Interoperability of (HAVi) Architectrure", XP002116332, version 1.0; Nov. 19, 1998, pp 1–384.*

"The HAVi Specification: Specification of the Home Audio/Video Interoperability (HAVi) Architecture", Version 1.0 beta, XP–002116332, Nov. 19, 1998, pp 1–384.

* cited by examiner

Primary Examiner—Wen Tai Lin
(74) Attorney, Agent, or Firm—Bell, Boyd & Lloyd LLC

(57) ABSTRACT

In a network connected with a plurality of electronic devices 11 to 16, an electronic device 13 as a leader inquires about system resource capacities from electronic devices 11 and 14 which can become controllers, in a step S1. The electronic device 13 further inquires about sizes of DCMs from electronic devices 12, 13, 15, and 16, respectively, in a step S2. The electronic device 13 calculates the memory capacities of the electronic devices 11 and 14 to which DCMs can be assigned, and the size of the DCM of each electronic device, in a step S3. Further, the electronic device 13 determines whether or not the DCM of each electronic device can be assigned to the electronic devices 11 and 14, in a step S4, and then assigns DCMs which can be possessed by the devices 11 and 14, respectively, in a step S5.

20 Claims, 5 Drawing Sheets

DEVICE OPERATION MANAGEMENT METHOD, A MANAGER DEVICE, A PROGRAM SUPPLY MEDIUM FOR SUPPLYING A DEVICE OPERATION MANAGEMENT PROGRAM, AN CONTROLLER DEVICE, AND AN ELECTRONIC DEVICE

A device operation management method, a manager device, a program supply medium for supplying a device operation management program, an controller device, and an electronic device.

BACKGROUND OF THE INVENTION

1. Field of the Invention

The present invention relates to a device operation management method for managing operation of each electronic device in a network connected with a plurality of electronic devices, a manager device thereof, and a program supply medium for supplying a device operation management program for realizing the device operation management method. The present invention also relates to a controller device for controlling the operation of each electronic device in the network connected with a plurality of electronic devices. Further, the present invention relates to an electronic device controlled by the controller device.

2. Description of the Related Art

In recent years, it has been discussed about use of various AV (Audio Visual) devices, such as a digital television (which will be hereinafter referred to as a DTV), a set-top box (which will be also hereinafter referred to as a STB), and the like, connected with each other to construct a home network.

In this kind of network system, each device requires so-called middleware to enable linked operation of connected devices. The middleware is software positioned between an application program and an OS (Operating System) and serves to control/manage the network.

In this network system, one of the devices on the network owns a software module for controlling devices. That is, the device which owns the software module is capable of controlling those devices on the network that are compatible with the module. When there a plurality of devices in this network system, each of which can own a software module, i.e., each of which has a resource capacity capable of controlling a certain device on the network, the one software module is not shared by a plurality of devices each having a sufficient resource capacity but is owned by only one device.

Meanwhile, in the network system described above, when there are a plurality of devices which are capable of owning a software module and the devices are connected to the network, any of those devices that make access to own the software module is selected in the order in which the devices make access, and the selected device owns the software module. Otherwise, when each device make connection with the network and a device which is allowed to own a software module is selected, the device which has least devices at this time point is selected and owns the software module.

However, in this network system, there is a case that a device which does not have a resource capacity sufficient for owning a software module is selected, resulting in failure of adding the software module.

SUMMARY OF THE INVENTION

To achieve the above object, the present invention has an object of providing a device operation management method and a manager device based on the method, by which software modules can be efficiently assigned to devices having rich resource capacities and flexible response can be taken in match with situation if there is a software module which is not possessed, by indicating so. Also, the present invention has an object of providing a program medium for supplying a device operation management program which realizes the device operation management method. Further, the present invention has an object of providing a controller device which possesses a software module assigned by a manager device and enables control of each device. Also, the present invention has an object of providing an electronic device for storing the size of a software module, to be controlled by the controller device.

A device operation management method according to the present invention, which achieves the above objects, manages device operation on a network constructed by connecting thereto at least one controller device through a serial bus interface and by connecting thereto at least one controlled device to be controlled by the controller device, and comprises: a resource capacity check step of checking a system resource capacity of the controller device, by a manager device which is determined so as to mange device operation, at initial setting when the network is constructed; a software capacity check step of checking a capacity of control software for controlling the controlled device, by the manager device; and an assignment step of assigning the control software to the controller device, by the manager device, based on results of the resource capacity check step and the control software capacity check step.

In the device operation management method as described above, control software is assigned to a controller device by a manager device, based on the system resource capacity of a controller device and the capacity of the control software for controlling a device to be controlled.

As a result of this, in the device operation management according to the present invention, the manager device can efficiently assign control software, so that control software can be securely possessed by a controller device.

In addition, in the device operation management method according to the present invention, if there is a part of the control software which cannot be assigned to the controller device as a result of the calculation step of comparing the system resource capacity and the capacity of the control software with each other by the manager device thereby to calculate the capacity of the control software that can be assigned to the controller device, a function of the control software is downgraded by the manager device to reduce the capacity of the control software.

In the device operation management method according to the present invention as described above, if it is determined that there is a part of control software which cannot be assigned to the controller device, as a result of comparing the system resource capacity and the capacity of the control software, the function of the control software is downgraded to reduce the capacity thereof, and thus, system resources of the controller device are adjusted.

As a result of this, even if it is determined that the system resource capacity is insufficient as a result of comparing the system resource capacity and the capacity of the control software, the function of the control software is downgraded to reduce the capacity thereof, and thus, the system resources which the controller device can use are adjusted. In this manner, the control software can be possessed by the controller device, and thus, control software can be possessed in common.

Further, a manager device according to the present invention, which achieves the above objects, manages device operation on a network constructed by connecting thereto at least one controller device through a serial bus interface and by also connecting thereto at least one controlled device to be controlled by the controller device, and comprises: resource capacity check means for checking with the controller device about a system resource capacity thereof; and control software capacity check means for checking a capacity of control software for controlling the controlled device; and assignment means for assigning the control software to the controller device, based on a result checked by the resource capacity check means and the control software capacity check means.

The manager device according to the present invention as described above assigns control software to a controller device, based on the system resource capacity of a controller device and the capacity of the control software for controlling a device to be controlled.

As a result of this, the manager device according to the present invention, the manager device can efficiently assign control software, based on the system resource capacity of a controller device and the capacity of the control software for controlling a controlled device, so that control software can be securely possessed by a controller device.

In addition, in the manager device according to the present invention, if there is a part of the control software which cannot be assigned to the controller device as a result of the calculation step of comparing the system resource capacity and the capacity of the control software with each other by the manager device thereby to calculate the capacity of the control software that can be assigned to the controller device, a function of the control software is downgraded by the manager device to reduce the capacity of the control software.

In the manager device according to the present invention as described above, if it is determined that there is a part of control software which cannot be assigned to the controller device, as a result of comparing the system resource capacity and the capacity of the control software and of calculating the capacity of control software which can be assigned to the controller device, by calculation means, the function of the control software is downgraded to reduce the capacity.

In the manager device according to the present invention as described above, if it is determined that there is a part of control software which cannot be assigned to the controller device, as a result of comparing the system resource capacity and the capacity of the control software, the function of the control software is downgraded to reduce the capacity thereof, and the control software with a reduced capacity is assigned to the controller device again.

As a result of this, even if it is determined that the system resource capacity is insufficient by comparing the system resource capacity of the controller device and the capacity of the control software, the function of the control software is downgraded to reduce the capacity thereof, and thus, the system resources which the controller device can use can be adjusted, so that the control software can be possessed by the controller device.

Also, a program supply medium according to the present invention, which achieves the above objects, supplies a device operation management program for managing device operation on a network constructed by connecting thereto at least one controller device through a serial bus interface and by connecting thereto at least one controlled device to be controlled by the controller device, and comprises: resource capacity check processing for checking a system resource capacity of the controller device, by a manager device which is determined so as to mange device operation, at initial setting when the network is constructed; software capacity check processing for checking a capacity of control software for controlling the controlled device, by the manager device; and assignment processing for assigning the control software to the controller device, by the manager device, based on results of the resource capacity check processing and the control software capacity check processing.

The program supply medium described above for supplying a device operation management program, according to the present invention, supplies a device operation management program capable of assigning control software to a controller device, based on the system resource capacity of a controller device and the capacity of the in control software for controlling a device to be controlled.

As a result of this, the program supply medium for supplying a device operation management program according to the present invention can supply a device operation management program capable of assigning control software to a controller device, based on the system resource capacity of a controller device and the capacity of the control software for controlling a device to be controlled, so that the controller device thus supplied with the device operation management program is capable of efficiently assigning control software to the controller device.

Further, in the program supply medium for supplying a device operation management program, according to the present invention, if there is a part of the control software which cannot be assigned to the controller device as a result of the calculation step of comparing the system resource capacity and the capacity of the control software with each other by the manager device thereby to calculate the capacity of the control software that can be assigned to the controller device, a function of the control software is downgraded by the manager device to reduce the capacity of the control software.

In the program supply medium for supplying a device operation management program, according to the present invention as described above, supplies a device operation management program capable of adjusting the system resources of the controller device by downgrading the function of the control software to reduce the capacity thereof, if it is determined that there is a part of control software which cannot be assigned to the controller device, as a result of comparing the system resource capacity and the capacity of the control software and of calculating the capacity of control software which can be assigned to the controller device, by calculation means.

As a result of this, the program supply medium for supplying a device operation management program, according to the present invention, can supply a device operation management program capable of downgrading the function of the control software to reduce the capacity thereof, so that the system resources which the controller device can use can be adjusted, if it is determined that there is a part of control software which cannot be assigned to the controller device, as a result of comparing the system resource capacity and the capacity of the control software. The manager device supplied with this device operation management program adjusts the system resources which can be used by the controller device, and thus, control software can be possessed in common by controller devices.

Further, a controller device according to the present invention, which achieves the above objects, is connected to a network constructed by a serial bus interface, and controls at least one controlled device to be controlled which is also connected to the network, wherein the controller device comprises memory means for possessing controller software for controlling the controlled device, and the controller device answers a capacity of the memory means to a manager device in response to an inquiry from the manager device which manages device operation on the network, and stores control software assigned by the manager device into the memory means.

The controller device according to the present invention as described above stores control software assigned by a manager device on the basis of the capacity of memory means which is answered in response to the manager device, into the memory means, and thus controls a device to be controlled.

As a result of this, in the controller device according to the present invention, the control software to be assigned by the manager device is determined by answering information concerning the capacity of memory means in response to an inquiry from a manager device, and the device to be controlled can be set under control.

In addition, an electronic device according to the present invention, which achieves the above objects, is an electronic device to be connected to a network constructed by a serial bus interface to which at least one controller device is connected, and comprises a memory means for storing a capacity of control software possessed by the controller device, to be controlled by the controller device.

The electronic device according to the present invention as described above stores the capacity of control software in memory means, and supplies the control software for a controller device selected based on the information concerning the capacity.

As a result of this, in the electronic device according to the present invention, the capacity of the control software is stored in memory means, so that the controller device can be managed to posses the control software, based on the information concerning the capacity. Accordingly, the electronic device can be controlled by the controller device.

DESCRIPTION OF THE PREFERRED EMBODIMENTS

In the following, detailed explanation will be made of embodiments to which the present invention is applied, with reference to the drawings.

An embodiments to which the present invention is applied is a network (which will be referred to as an IEEE1394 network) 10 connected to a plurality of electronic devices 11, 12, 13, 14, 15, and 16 through an IEEE 1394 serial bus 20 according to a IEEE Std. 1994–1995 IEEE Standard for a High Performance serial Bus (which will be hereinafter abbreviated as IEEE 1394). The electronic devices 11 to 16 are, for example, set-top boxes such as a so-called DVCR (Digital Video Cassette Recorder), a digital audio disk, and the like, each of which comprises a memory not shown for storing various information. So-called HAVi (Home Audio/Video interoperability) is used as the middleware for controlling/managing this IEEE 1394 network 10. Explained now will be the HAVi.

Figure 1:
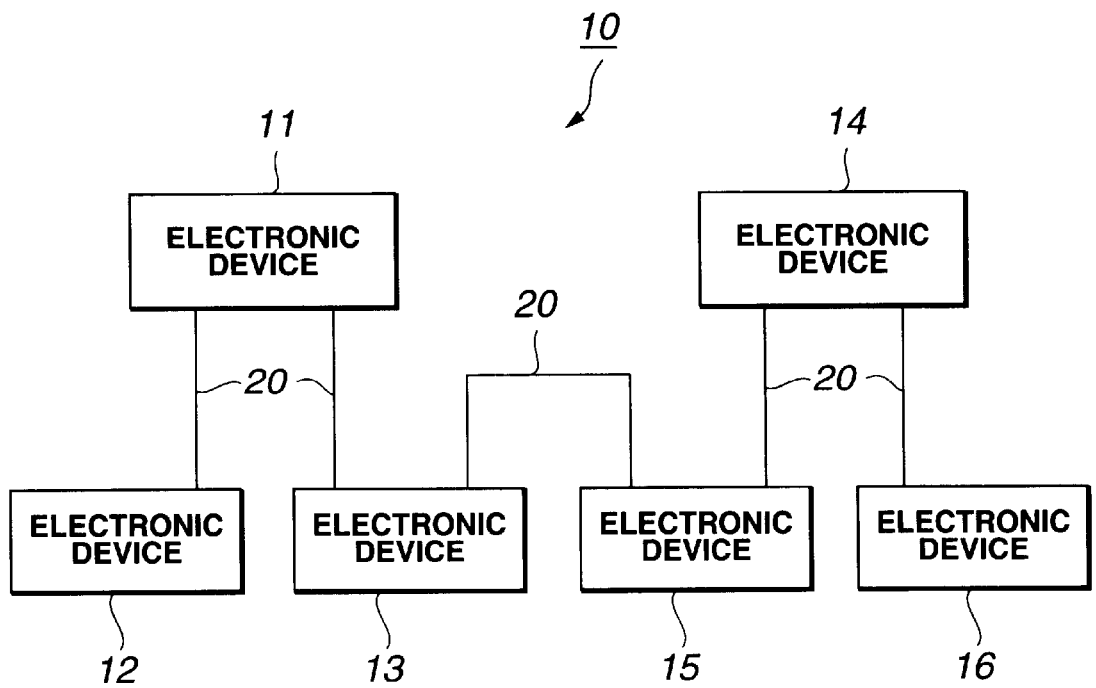
FIG. 1 is a block diagram showing the structure of an IEEE1394 network as an embodiment of the present invention.
Figure 2:
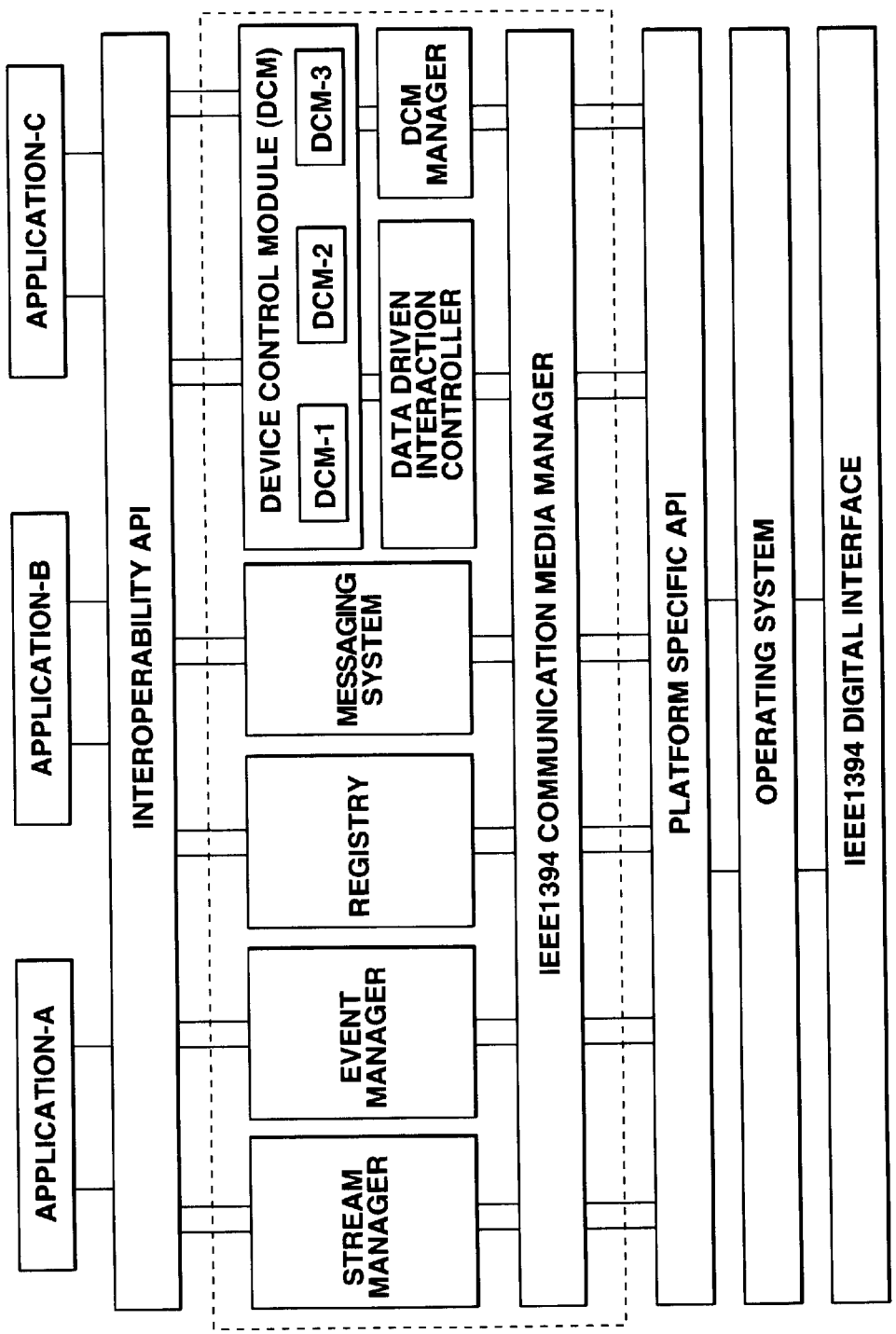
FIG. 2 is a diagram which explains HAVi applied to the IEEE1394 network and shows software components defined by HAVi.

Basic specifications of HAVi were settled so that common application programs can be used in devices provided by different manufacturers (or makers). A network constructed by connecting AV devices is dealt with as the target of HAVi, and the HAVi serves as middleware for managing/controlling the network. There are eight kinds of main software components defined in the HAVi, as indicated in FIG. 2 surrounded by a broken line.

1394 communication media manager (IEEE1394 Communication Media Manager) functions as an interface between IEEE1394 and each software component or application program. That is, the 1394 communication media manager provides a transmission mechanism for sending/receiving commands to/from other devices, grasps the operation status of the IEEE1394 serial bus, and provides information thereof to other software components.

The event manager serves to an event to other software components. For example, an event is a case that the status of the network is changed by connection of a new device or disconnection thereof. In the network using HAVi, particularly, when a device is newly connected or disconnected, the event manager transmits the change concerning this device to each device on the network thereby to realize conveniences of plug-and-play which will be described later.

The registry serves to maintain and update information concerning devices, as to what devices are connected to the network, what information the devices have, or so, and thus enables mutual operation between different devices. In the network using HAVi, application programs can obtain necessary information from this registry. Also, devices are capable of identifying existences of basic software components of other devices on the network by referring to the registry.

The messaging system operates as an API (Application Programming Interface) for software components of devices on the network to communicate with each other and functions to transfer messages between the software components each other. As a result of this, in the network using HAVi, the side transmitting a message and the side receiving the message can exchanges the message without knowing their own addresses on the network.

The device control module (hereinafter abbreviated as only DCM) serves to control of devices. In the network using HAVi, application programs do not directly access devices but access the device control module to controller devices. Since the DCM also functions as an API, application programs need not consider distinctions between devices. Accordingly, in the network using HAVi, a device on the network a is capable of recognizing the functions of other devices, so that other devices can be operated from a remote place.

The DCM manager serves to install the DCM into devices on the network. In the network using HAVi, when a new device is connected to the network, the DCM manager installs a DCM necessary to the device, thus automatically responding to changes in the network. Therefore, in the network using HAVi, operation of devices can be maintained even when the network is being reconstructed.

The data driven interaction controller provides a GUI (Graphical User Interface) to a display section of a display or the like. The data driven interaction controller has variety of GUIs and can respond to various displays including a display specialized for text data up to a graphic display, by using the data. That is, the data driven interaction controller serves to assist users' operations.

The stream manager monitors/manages flow of stream data such as videos, sounds, and the like on the network to enable real-time transfer of stream data. The stream manager also manages connections inside each device and between devices each other. Further, the stream manager secures and releases network resources and also provides connection information concerning the entire network. In addition, the stream manager is capable of supporting reconnection of the network after reset of the network.

These software complements are possessed depending on the classes of devices defined in the HAVi. The HAVi defines four types of classes of devices which are FAV (Full AV device), IAV (Intermediate AV device), BAV (Base AV device), and LAV (Legacy AV device).

The FAV assumes devices which manage totally a network and devices together, such as DTV, STV, and the like and which are compatible with all the eight kinds of software components described above. In addition, FAV devices are capable of HAVi byte codes which describe software for realizing new functions of devices. A FAV device naturally has its own DCM and can also posses DCMs of other devices, so that another device having a DCM can be set under control of a FAV device. The IAV assumes STB or the like, similarly in the case of the FAV, but does not comprises an environment for executing HAVi byte codes. Consequently, an IAV device can have its own DCM but cannot possesses DCMs of other devices.

The BAV assumes devices to be controlled which are only controlled by other devices.

The LAV assumes devices which are not compatible with HAVi but comprise their own interfaces. These devices, however, are compatible with AV/C (Audio Video/Control) commands, so that a LAV device operates alone and also as a controlled device.

In the network using the HAVi as described above, users can have the following conveniences.

At first, in the network using HAVi, a network can be constructed by simply connecting various devices through a digital interface such as IEEE1394 or the like. That is, in the network using HAVi, even when a device is newly connected or disconnected, devices can recognized that the network is updated, in a manner that the devices communicate with each other, for example. Accordingly, the network using HAVi can provide plug-and-play by which the network automatically responds to a new device layout without stopping its functions.

In addition, in the network using HAVi, not only devices can make connection between each other but also it is possible to share a function between devices on the network. In the network using HAVi, a function of a device which is not included in a device can be.

Further, in the network using HAVi, a new function used by a new network application program can be used on the network which has already been used. That is, in the network using HAVi, even newly developed devices and functions can be operated by merely connecting those devices to the network.

Note that the HAVi is applicable not only to the network constructed by an IEEE1394 serial bus but also to a network connected by another digital serial bus such as Ethernet, USB, and the like.

Figure 3:
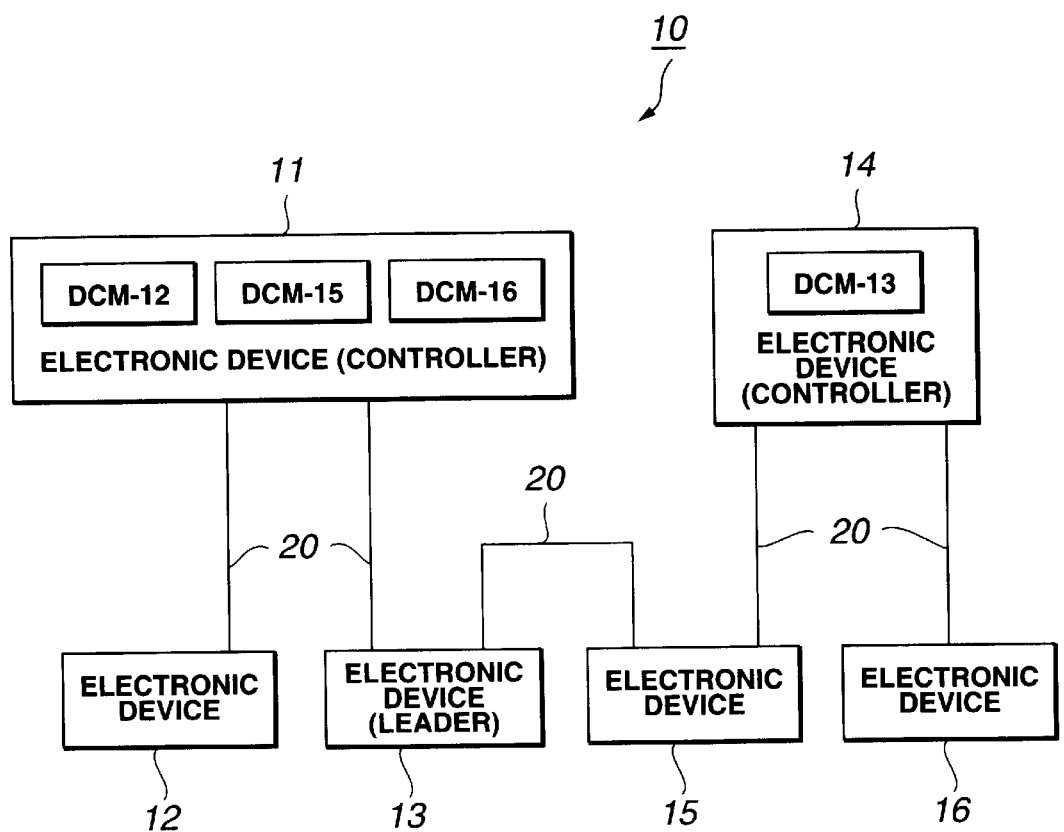
FIG. 3 is a block diagram which explains the structure of the IEEE1394 network, wherein an electronic device possesses DCMs of electronic devices.

In the IEEE1394 network 10 which adopts the above-described HAVi as middleware, as shown in FIG. 3, each electronic device can be controlled in a manner that an electronic device which is a device specialized for control and equivalent to FAV stores a DCM as control software into a memory not shown. The method of possessing the DCM will now be explained below. In the following, it is supposed that electronic devices 11 and 14 are equivalent to FAV devices and can serve as controllers. In addition, these electronic devices 11 and 14 each comprises a display section such as a display or the like.

In the IEEE1394 network 10, an electronic device called as a leader which determines which electronic device should own a DCM is selected, in the stage in which electronic devices 11, 12, 13, 14, 15, and 16 are connected and so-called topology is determined. This leader refers to the registry describe previously, thereby to recognize whether each of the electronic devices 11 to 16 is capable of serving as a controller or is an electronic device to be controlled. In the IEEE1394 network 10, any of electronic devices can become a leader, e.g., the electronic device which has becomes a controller can also serves as a leader. The following explanation will be made supposing that the electronic device 13 is a leader.

Figure 4:
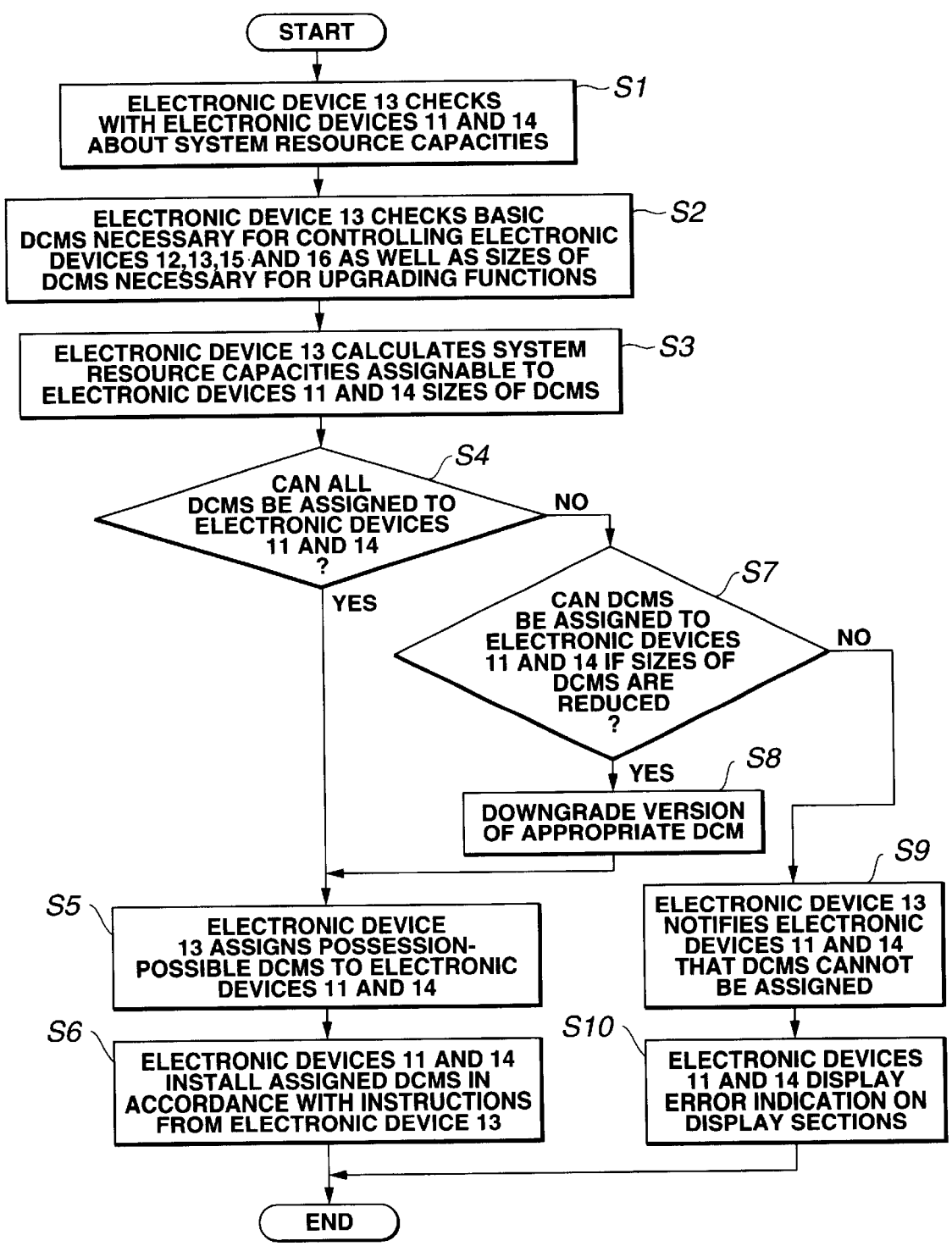
FIG. 4 is a flowchart which explains a series of steps when DCM of each electronic device is assigned to an electronic device which can become a controller.

In the IEEE1394 network 10, as shown in FIG. 4, the electronic device 13 as a leader checks with the electronic devices 11 and 14 about system resource capacities such as their memory capacities, by a CPU not shown or the like which serves as a resource capacity recognition means, in the step S1. That is, the electronic devices 11 and 14 have previously stored information concerning their own memory capacities at shipment and calculate their usable memory capacities by subtracting memory capacities for DCMs for controlling themselves and other various information which are possessed at present. Then, the electronic devices 11 and 14 respond to the electronic device. In this manner, the electronic device 13 as a leader can know the usable memory capacities in the electronic devices 11 and 14. In this case, it is supposed that the memory capacity of the electronic device 11 is much greater than that of the electronic device 14.

Next, in the step S2, the electronic device 13 as a leader checks with the electronic devices 12, 15, and 16, as well as the device 13 itself, about the smallest sizes of the DCMs for basic functions which are necessary for the devices to control themselves, respectively. In addition, if any of the devices 12, 15, 16, and the device 13 itself includes a DCM for upgrading functions in addition of the DCMs for basic functions, the electronic device 13 as a leader checks with these devices about the size of the DCM. Each of the electronic devices 12, 13, 15, and 16 stores size information concerning the DCM for control itself in a memory not shown, and replays to the check from the electronic device 13. As a result of this, the electronic device 13 can investigate the size of the DCMs of the electronic devices 12, 13, 15, and 16. Suppose now that the size of the DCM of the electronic device 13 is much greater than those of the electronic devices 12, 15, and 16. If any of the electronic devices 12, 15, and 16 is equivalent to LAV, the electronic device 13 as a leader check with the electronic device 11 or 14 which can become a controller, about the size of the DCM of the electronic device as a LAV device. The electronic device 11 or 14 previously comprises information concerning sizes of general DCMs depending on device types of electronic devices equivalent to LAV devices. Therefore, the electronic device 13 as a leader can check the size of the DCM of the electronic device equivalent to a LAV device.

Further, in the step S3, the electronic device 13 as a leader calculates the memory capacities of the electronic devices 11 and 14 to which DCMs can be assigned and also the sizes of DCMs of the electronic devices 12, 13, 15, and 16 which should be assigned, by a CPU or the like not shown which has a function as a calculation means. In the step S4, the device 13 determines whether or not all the DCMs of the electronic devices 12, 13, 15, and 16 can be assigned to the electronic devices 11 and 14. At this time, if there is no DCM on the IEEE1394 network 10 like in the case of a DCM of an electronic device as a LAV device, the electronic devices 11 and 14 which can serve as controllers can generate a DCM for a basic function of the electronic device.

If it is determined in the step S4 that all DCMs can be assigned, the electronic device 13 as a leader assigns, to the electronic devices 11 and 14, those DCMs which the devices 11 and 11 can posses, by a CPU or the like which serves as a assignment means. Further, in the step S6, the electronic devices 11 and 14 install the assigned DCMs to memories not shown in accordance with instructions from the electronic device 13 as a leader, thereby completing a series of processing.

Thus, in the IEEE1394 network 10, the DCMs of the electronic devices 13, 15, and 16 are assigned to the electronic devices 11 and 14. For example, as shown in FIG. 3, the DCMs of the electronic devices 12, 15, and 16 are assigned to the electronic device 11 and the DCM of the electronic device 13 is assigned to the electronic device 14.

Otherwise, if it is determined in the step S4 that all the DCMs cannot be assigned, e.g., if it is determined that a DCM of the electronic device 16 cannot be assigned to any of the electronic devices 11 and 14, the electronic device 13 as a leader does not assign the upgraded DCM but downgrades the version of the DCM to the basic function, as a DCM of any of the electronic devices 12, 13, 15, and 16 and thereby tries to assign the DCM to the electronic devices 11 and 14.

For example, the electronic device 13 as a leader calculates the sizes of the basic functions of the DCMs of the electronic devices 12, 13, and 15, and the sizes of the upgraded DCMs thereof. As a result, if it is determined that all of these DCMs can be assigned to the electronic device 11 when the DCMs of the electronic devices 12, 15, and 16 are downgraded to their basic functions, the electronic device 13 as a leader downgrades the DCMs of the electronic devices 12, 15, and 16 to the versions of the basic functions, in the step S8. Further, the electronic device 13 as a leader assigns the DCMs of the basic functions of the electronic devices 12, 15, and 16 to the electronic device 11, and also assigns the DCM of the electronic device 13 to the electronic device 14, in the step S5. Further, the electronic devices 11 and 14 install the assigned DCMs into the memories not shown, thereby finishing a series of processing.

In this manner, in the IEEE1394 network 10, the DCMs of the electronic devices 12, 13, 15, and 16 are assigned to the electronic devices 11 and 14. For example, as shown in FIG. 3, the DCMs of the basic functions of the electronic devices 12, 15, and 16 are assigned to the electronic device 11, and the DCM of the electronic device 13 is assigned to the electronic device 14.

In addition, if it is determined in the step S7 that all the DCM cannot be assigned no matter how calculation is made, i.e., if it is determined that the DCM of the electronic device 16 cannot be assigned in this case, the electronic device 13 as a leader notifies the electronic devices 11 and 14 of the that the DCM of the electronic device 16 cannot be assigned. Upon receipt of this notification, the electronic devices 11 and 14 provide an error indication on their display sections, and thus, a series of processing is finished. Note that this error indication may be carried out on the electronic device 13 if the electronic device 13 as a leader has a display function.

As has been explained above, in the IEEE1394 network 10 shown as an embodiment of the present invention, the electronic device 13 which has become a leader assigns efficiently DCMs to the electronic devices 11 and 14 which are capable of possessing DCMs to become controllers. Thus, DCMs can be installed into the electronic devices 11 and 14 which are able to serve as controllers.

In addition, in the IEEE1394 network 10, in case where the electronic devices 11 and 14 which are able to become controllers have insufficient system resource capacities, functions of DCMs are downgraded and the sizes thereof are reduced, so as to adjust the system resources which can be used by the electronic devices 11 and 14. As a result, the DCMs can be installed, and thus, advantageous common use of DCMs can be achieved.

Further, in the IEEE1394 network 10, if there is a DCM which cannot be assigned even by adjusting system resources, the electronic device 11 and 14 which are able to become controllers and the electronic device 13 as a leader displays an indication that a desired DCM of an electronic device cannot be obtained, so that users can be notified of impossibility for control of the electronic device and shortage of system resources of the electronic devices 11 and 14. As a result of this, in the IEEE1394 network 10, a user arbitrarily can delete a DCM unnecessary for use, adjust the system resources of the electronic devices 11 and 14, and can install a desired DCM into the electronic devices 11 and 14. Thus, flexible responses can be taken in accordance with the situation.

For example, suppose a case that the electronic device 16 performs recording/reproducing with respect to a recording medium and the electronic device 11 which can become as a controller handles an application program for controlling recording/reproducing with respect to a recording medium such as a so-called CD (Compact Disc) or MD (Mini Disk) capable of recording music data. In this case, even if the electronic device 11 does not have a system resource enough to posses the DCM of the electronic device 16, the DCM of the electronic device 16, which has not been possessed by the electronic device 11, can be newly added to the electronic device 11, by deleting another DCM than that of the electronic device 16, which the electronic device 11 posses, or by assigning it to another electronic device 14 which is able to become a controller, so that this device 14 posses the another DCM, in the IEEE1394 network.

Figure 5:
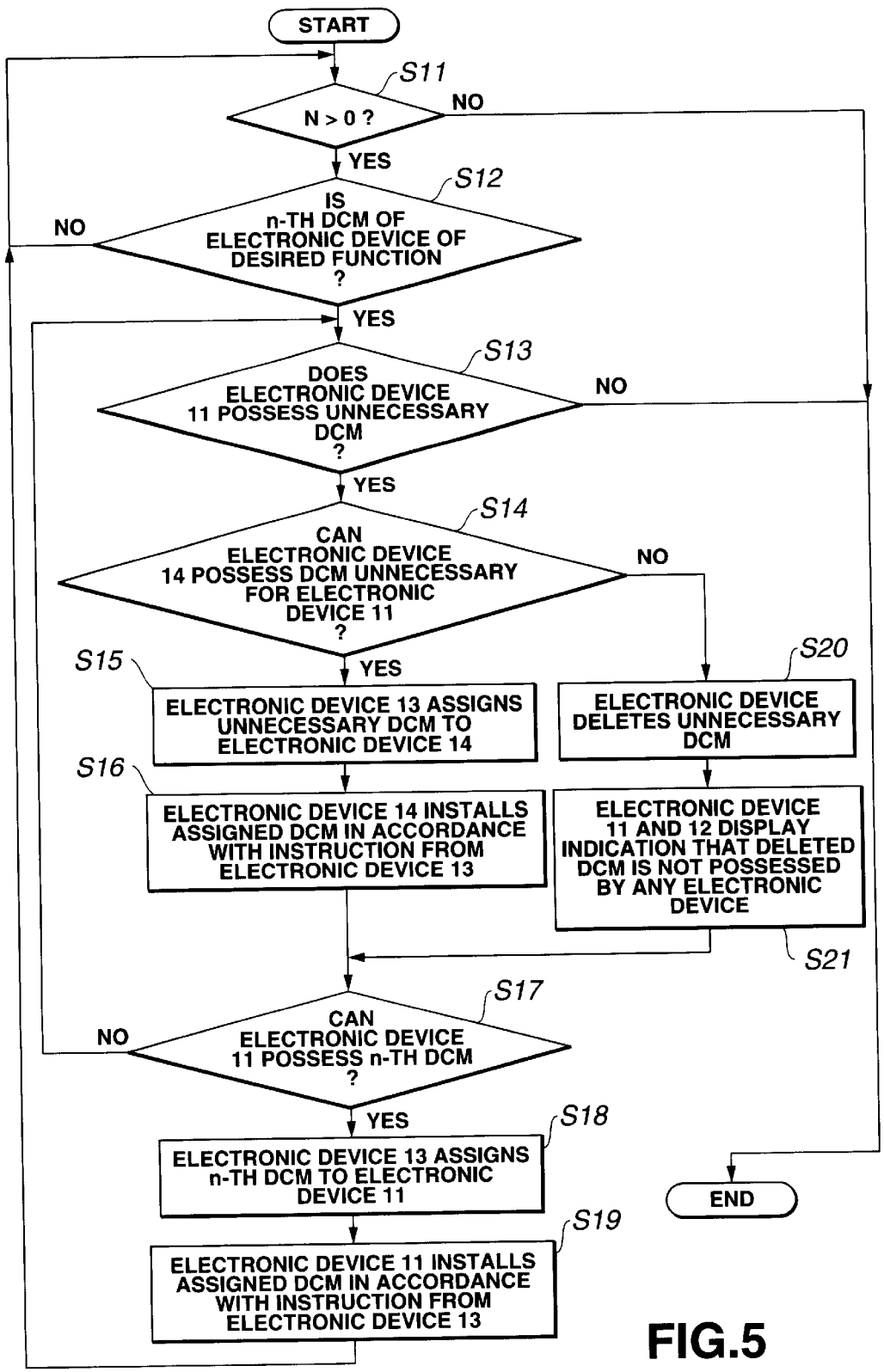
FIG. 5 is a flowchart which explains a series of steps when DCM is assigned to an electronic device which can become a controller if DCM which is not possessed by the electronic device which can become a controller is added newly.

Thus, in case where there are DCMs which are not possessed by the electronic devices 11 and 14 which are able to become controllers, these DCMs can be assigned to the electronic devices 11 and 14 through the series of steps as shown in FIG. 5. Explanation will now be made of a case in which a DCM is assigned to the electronic device 11 where n is the number of DCMs which operate based on the application program of the electronic device 11 but are not possessed by the electronic devices 11 and 14.

In the IEEE1394 network 10, as shown in the same figure, the electronic device 13 as a leader determines, by a CPU or the like not shown, whether or not n>0 is satisfied, i.e., whether or not there is a DCM or DCMs that are not possessed by the electronic devices 11 and 14.

Here, if n>0 is not satisfied, i.e., if there is no DCM which is not possessed by the electronic devices 11 and 14, the series of processing is ended.

Otherwise, if n>0 is satisfied, i.e., if there is a DCM which is not possessed by the electronic devices 11 and 14, the electronic device 13 as a leader determines whether or not the n-th DCM is of the electronic device of a desired function, i.e., whether or not the n-th DCM is of the electronic device which should be operated on the basis of the application program of the electronic device 11, by a CPU or the like which functions as a desired function determination means, in the step S12.

If the n-th DCM is not of the electronic device of the desired function, the processing goes to the step S11.

Otherwise, if the n-th DCM is of the electronic device of the desired function, the electronic device 11 which can become a controller determines whether or not it possesses a DCM unnecessary for its own application program, by a CPU or the like not shown which functions as a possession determination means, on the basis of an instruction from the electronic device 13 as a leader, in the step S13.

If the electronic device 11 does not possess an unnecessary DCM, the electronic device 11 which can become a controller or the electronic device 13 as a leader displays an error indication, on a display section not shown, that the n-th DCM, which is the DCM of the electronic device of the desired function, could not been installed. A series of processing is then ended.

Otherwise, if the electronic device 11 possesses an unnecessary DCM, the electronic device 13 as a leader determines whether or not the unnecessary DCM can be possessed by another electronic device 14 which can also become a controller, by a CPU or the like not shown which functions as a possession possibility determination means, in the step S14.

If the electronic device 11 can possess the unnecessary DCM, the electronic device 13 as a leader assigns the DCM unnecessary for the electronic device 11 to the electronic device 14 by a CPU or the like not shown, in the step S15. Further, the electronic device 14 installs the assigned DCM into a memory not shown, and shift the processing to the step S17.

Otherwise, if the electronic device 11 can not possess the unnecessary DCM, the electronic device 11 deletes the unnecessary DCM, by a CPU or the like not shown, based on user's operation or an instruction from the electronic device 13 as a leader. Further, the electronic device 11 and/or the electronic device 13 provides an indication, on a display section not shown, that the deleted DCM is not possessed by the electronic device 11 or 14. The processing is then shifted to the step S17.

Next, the electronic device 13 determines whether the n-th DCM which is the DCM of the electronic device of the desired function can be possessed by the electronic device 11, by a CPU or the like not shown, in the step S17.

Then, if the electronic device 11 cannot posses the DCM of the electronic device of the desired function, the processing is shifted to the step S13 and the processing from the step S13 is repeated.

Otherwise, if the electronic device 11 can posses the DCM of the electronic device of the desired function, the electronic device 13 as a leader assigns the DCM of the electronic device of the desired function which is the n-th DCM to the electronic device 11 by a CPU or the like not shown, in the step S18. Further, the electronic device 11 installs the assigned DCM into a memory not shown, in accordance with an instruction from the electronic device 13 as a leader. The processing is then shifted to the step S17, and processing for other DCMs is carried out.

In this manner, in the IEEE network 10, even in case where there are DCMs which are not possessed by the electronic devices 11 and 14 capable of serving as controllers, the DCMs can be assigned to the electronic devices 11 and 14.

Note that, in this case, if the electronic device 11 cannot posses an n-th DCM by any way, this DCM may be assigned to the electronic device 14.

A device operation program which realizes the series of processing for assigning DCMs as shown in FIGS. 4 and 5 may be previously stored in each of the memories or the like of the electronic devices 11 to 16. However, this program may be supplied in form of a recording medium such as a CD-ROM or the like. By writing and storing a device operation program thus recorded in a recording medium into a memory or the like, for example, each electronic device as a leader can execute the series of processing described above.

In addition, the present invention is not limited to the embodiment described above but is applicable not only to the IEEE1394 network but also to a network constructed by a digital serial bus such as Ethernet, USB, or the like. Further, although the present invention uses HAVi as middleware, other middleware than the HAVi is also applicable.

Furthermore, the present invention has been explained such that the electronic device 13 as a leader simultaneously grasps the system resources comprised in both the electronic devices 11 and 14 and handles assignment of DCMs. However, DCMs may be assigned for every electronic device which can become a controller, such that DCMs are assigned firstly to the electronic device 11 and thereafter to the electronic device 14.

Also, in the present invention, two electronic devices 11 and 14 have been adopted as electronic devices which can become controllers on the network. Of course, the number of electronic devices which can become controllers may be one or three or more.

In addition to the above, the present invention can be variously modified without deriving from the subject matter of the present invention.

What is claimed is:

1. A device operation management method for managing device operation on a network constructed by connecting thereto a plurality of controller devices through a serial bus interface and by connecting thereto at least one controlled device to be controlled by at least one of the controller devices, the method comprising:

a resource capacity check step of checking a system resource capacity of each of the plurality of controller devices, by a manager device which is determined so as to manage device operation, at initial setting when the network is constructed;

a software capacity check step of checking a capacity of control software for controlling the controlled device, by the manager device; and an assignment step of assigning the control software to at least one of the controller devices, by the manager device, based on results of the resource capacity check step and the software capacity check step in which the capacity of control software is compared to the system resource capacity of each of the plurality of controller devices;

wherein if it is impossible to assign the control software to an arbitrary controller device, unnecessary control software possessed by the arbitrary controller device is assigned to another controller device by the manager device or is deleted by the arbitrary controller device, based on an instruction from the manager device, and then, the control software is assigned to the arbitrary controller device;

further comprising:

a desired function determination step of determining whether or not the control software controls a controlled device of a desired function, by the manager device;

a possession determination step of determining whether or not the arbitrary controller device possesses unnecessary control software, based on an instruction from the manager device if the control software is determined to be of the controller device of the desired function as a result of determination in the desired function determination step; and a possession possibility determination step of determining whether or not another controller device can possess the unnecessary control software, by the manager device, if the arbitrary controller device is determined as possessing the unnecessary control software, as a result of determination in the possession determination step.

2. A method according to claim 1, wherein if the arbitrary controller device is determined as not possessing the unnecessary control software, as a result of the determination in the possession determination step, an indication that the control software cannot be assigned to the arbitrary controller device is displayed on a display of the manager device or the arbitrary controller device.

3. A device operation management method for managing device operation on a network constructed by connecting thereto a plurality of controller devices through a serial bus interface and by connecting thereto at least one controlled device to be controlled by at least one of the controller devices, the method comprising:

a resource capacity check step of checking a system resource capacity of each of the plurality of controller devices, by a manager device which is determined so as to manage device operation, at initial setting when the network is constructed;

a software capacity check step of checking a capacity of control software for controlling the controlled device, by the manager device; and an assignment step of assigning the control software to at least one of the controller devices, by the manager device, based on results of the resource capacity check step and the software capacity check step in which the capacity of control software is compared to the system resource capacity of each of the plurality of controller devices;

wherein if it is impossible to assign the control software to an arbitrary controller device, unnecessary control software possessed by the arbitrary controller device is assigned to another controller device by the manager device or is deleted by the arbitrary controller device, based on an instruction from the manager device, and then, the control software is assigned to the arbitrary controller device;

further comprising:

wherein if the unnecessary control software is deleted, an indication that the unnecessary control software is not possessed by any controller device on the network is displayed on a display of the arbitrary controller device.

4. A manager device for managing device operation on a network constructed by connecting thereto a plurality of controller devices through a serial bus interface and by also connecting thereto at least one controlled device to be controlled by at least one of the controller devices, comprising:

resource capacity check means for checking with the plurality of controller devices about a system resource capacity of each of the plurality of controller devices; and control software capacity check means for checking a capacity of control software for controlling the controlled device; and assignment means for assigning the control software to at least one of the controller devices, based on a result checked by the resource capacity check means and the control software capacity check means in which the capacity of control software is compared to the system resource capacity of each of the plurality of controller devices;

wherein if it is impossible to assign the control software to an arbitrary controller device, unnecessary control software possessed by the arbitrary controller device is assigned to another controller device or is deleted by the arbitrary controller, and then, the control software is assigned to the arbitrary controller device;

further comprising:

desired function determination means for determining whether or not the control software controls a controlled device of a desired function; and possession possibility determination means for making, if the control software is determined to be of the controller device of the desired function, the arbitrary controller device determine whether or not the arbitrary controller device possesses unnecessary control software, and for determining, if the arbitrary controller device is determined as possessing the unnecessary control software as a result, whether or not another controller device can possess the unnecessary control software.

5. A device according to claim 4, further comprising display means for displaying an indication that the control software cannot be assigned to the arbitrary controller device, if the arbitrary controller device is determined as not possessing the unnecessary control software.

6. A manager device for managing device operation on a network constructed by connecting thereto a plurality of controller devices through a serial bus interface and by also connecting thereto at least one controlled device to be controlled by at least one of the controller devices, comprising:

resource capacity check means for checking with the plurality of controller devices about a system resource capacity of each of the plurality of controller devices; and control software capacity check means for checking a capacity of control software for controlling the controlled device; and assignment means for assigning the control software to at least one of the controller devices, based on a result checked by the resource capacity check means and the control software capacity check means in which the capacity of control software is compared to the system resource capacity of each of the plurality of controller devices;

wherein if it is impossible to assign the control software to an arbitrary controller device, unnecessary control software possessed by the arbitrary controller device is assigned to another controller device by the manager device or is deleted by the arbitrary controller device, based on an instruction from the manager device, and then, the control software is assigned to the arbitrary controller device;

further comprising display means for displaying, if the unnecessary control software is deleted, an indication that the unnecessary control software is not possessed by any controller device on the network.

7. A program supply medium for supplying a device operation management program for managing device operation on a network constructed by connecting thereto a plurality of controller devices through a serial bus interface and by connecting thereto at least one controlled device to be controlled by at least one of the controller devices, the medium comprising:

resource capacity check processing for checking a system resource capacity of each of the plurality of controller devices, by a manager device which is determined so as to mange device operation, at initial setting when the network is constructed;

software capacity check processing for checking a capacity of control software for controlling the controlled device, by the manager device; and assignment processing for assigning the control software to at least one of the controller devices, by the manager device, based on results of the resource capacity check processing and the software capacity check processing in which the capacity of control software is compared to the system resource capacity of each of the plurality of controller devices;

wherein if it is impossible to assign the control software to an arbitrary controller device, unnecessary control software possessed by the arbitrary controller device is assigned to another controller device by the manager device or is deleted by the arbitrary controller device, based on an instruction from the manager device, and then, the control software is assigned to the arbitrary controller device;

further comprising:
desired function determination processing for determining whether or not the control software controls a controlled device of a desired function, by the manager device;

possession determination processing for determining whether or not the arbitrary controller device possesses unnecessary control software, based on an instruction from the manager device, if the control software is determined to be of the controller device of the desired function as a result of determination made by the desired function determination processing; and possession possibility determination processing for determining whether or not another controller device can possess the unnecessary control software, by the manager device, if the arbitrary controller device is determined as possessing the unnecessary control software, as a result of determination made by the possession determination processing.

8. A medium according to claim 7, wherein if the arbitrary controller device is determined as not possessing the unnecessary control software, as a result of the determination made by the possession determination processing, an indication that the control software cannot be assigned to the arbitrary controller device is displayed on a display of the manager device or the arbitrary controller device.

9. A program supply medium for supplying a device operation management program for managing device operation on a network constructed by connecting thereto a plurality of controller devices through a serial bus interface and by connecting thereto at least one controlled device to be controlled by at least one of the controller devices, the medium comprising:

resource capacity check processing for checking a system resource capacity of each of the plurality of controller devices, by a manager device which is determined so as to mange device operation, at initial setting when the network is constructed;

software capacity check processing for checking a capacity of control software for controlling the controlled device, by the manager device; and assignment processing for assigning the control software to at least one of the controller devices, by the manager device, based on results of the resource capacity check processing and the software capacity check processing in which the capacity of control software is compared to the system resource capacity of each of the plurality of controller devices;

wherein if it is impossible to assign the control software to an arbitrary controller device, unnecessary control software possessed by the arbitrary controller device is assigned to another controller device by the manager device or is deleted by the arbitrary controller device, based on an instruction from the manager device, and then, the control software is assigned to the arbitrary controller device;

wherein if the unnecessary control software is deleted, an indication that the unnecessary control software is not possessed by any controller device on the network is displayed on a display means of the arbitrary controller device.

10. A plurality of controller devices connected to a network constructed by a serial bus interface, for controlling at least one controlled device to be controlled which is also connected to the network, wherein each controller device comprises memory means for possessing controller software for controlling the controlled device, and each controller device answers a capacity of the memory means to a manager device in response to an inquiry from the manager device which manages device operation on the network, and stores control software assigned by the manager device into the memory means;

wherein if it is impossible to assign the control software, the controller device deletes unnecessary control software stored in the memory means, based on an instruction from the manager device, and stores the control software into the memory means;

further comprising possession determination means for determining whether or not the unnecessary control software is stored in the memory means, based on an instruction from the manager device, if the control software is of a controlled device of a desired function.

11. A controller device according to claim 10, further comprising display means for displaying an instruction that it is possible to possess the control software, if the unnecessary control software is not stored in the memory means.

12. A plurality of controller devices connected to a network constructed by a serial bus interface, for controlling at least one controlled device to be controlled which is also connected to the network, wherein each controller device comprises memory means for possessing controller software for controlling the controlled device, and each controller device answers a capacity of the memory means to a manager device in response to an inquiry from the manager device which manages device operation on the network, and stores control software assigned by the manager device into the memory means;

wherein if it is impossible to assign the control software, the controller device deletes unnecessary control software stored in the memory means, based on an instruction from the manager device, and stores the control software into the memory means;

further comprising display means for displaying an indication that the unnecessary control software is not possessed by any controller device on the network, if the unnecessary control software is deleted.

13. A device operation management method for managing device operation on a network constructed by connecting thereto at least one controller device through a serial bus interface and by connecting thereto at least one controlled device to be controlled by the controller device, the method comprising:

a resource capacity check step of checking a system resource capacity of the controller device, by a manager device which is determined so as to manage device operation, at initial setting when the network is constructed;

a software capacity check step of checking a capacity of control software for controlling the controlled device, by the manager device; and an assignment step of assigning the control software to the controller device, by the manager device, based on results of the resource capacity check step and the software capacity check step;

wherein if it is impossible to assign the control software to an arbitrary controller device, unnecessary control software possessed by the arbitrary controller device is assigned to another controller device by the manager device or is deleted by the arbitrary controller device, based on an instruction from the manager device, and then, the control software is assigned to the arbitrary controller device; and further comprising:

a desired function determination step of determining whether or not the control software controls a controlled device of a desired function, by the manager device;

a possession determination step of determining whether or not the arbitrary controller device possesses unnecessary control software, based on an instruction from the manager device, if the control software is determined to be of the controller device of the desired function as a result of determination in the desired function determination step; and a possession possibility determination step of determining whether or not another controller device can possess the unnecessary control software, by the manager device, if the arbitrary controller device is determined as possessing the unnecessary control software, as a result of determination in the possession determination step.

14. A device operation management method for managing device operation on a network constructed by connecting thereto at least one controller device through a serial bus interface and by connecting thereto at least one controlled device to be controlled by the controller device, the method comprising:

a resource capacity check step of checking a system resource capacity of the controller device, by a manager device which is determined so as to manage device operation, at initial setting when the network is constructed;

a software capacity check step of checking a capacity of control software for controlling the controlled device, by the manager device; and an assignment step of assigning the control software to the controller device, by the manager device, based on results of the resource capacity check step and the software capacity check step;

wherein if it is impossible to assign the control software to an arbitrary controller device, unnecessary control software possessed by the arbitrary controller device is assigned to another controller device by the manager device or is deleted by the arbitrary controller device, based on an instruction from the manager device, and then, the control software is assigned to the arbitrary controller device; and wherein if the unnecessary control software is deleted, an indication that the unnecessary control software is not possessed by any controller device on the network is displayed on a display means of the arbitrary controller device.

15. A manager device for managing device operation on a network constructed by connecting thereto at least one controller device through a serial bus interface and by also connecting thereto at least one controlled device to be controlled by the controller device, comprising:

resource capacity check means for checking with the controller device about a system resource capacity thereof;

control software capacity check means for checking a capacity of control software for controlling the controlled device; and assignment means for assigning the control software to the controller device, based on a result checked by the resource capacity check means and the control software capacity check means;

wherein if it is impossible to assign the control software to an arbitrary controller device, unnecessary control software possessed by the arbitrary controller device is assigned to another controller device or is deleted by the arbitrary controller, and then, the control software is assigned to the arbitrary controller device; and further comprising:

desired function determination means for determining whether or not the control software controls a controlled device of a desired function; and possession possibility determination means for making, if the control software is determined to be of the controller device of the desired function, the arbitrary controller device determine whether or not the arbitrary controller device possesses unnecessary control software, and for determining, if the arbitrary controller device is determined as possessing the unnecessary control software as a result, whether or not another controller device can possess the unnecessary control software.

16. A manager device for managing device operation on a network constructed by connecting thereto at least one controller device through a serial bus interface and by also connecting thereto at least one controlled device to be controlled by the controller device, comprising:

resource capacity check means for checking with the controller device about a system resource capacity thereof;

control software capacity check means for checking a capacity of control software for controlling the controlled device;

assignment means for assigning the control software to the controller device, based on a result checked by the resource capacity check means and the control software capacity check means;

wherein if it is impossible to assign the control software to an arbitrary controller device, unnecessary control software possessed by the arbitrary controller device is assigned to another controller device or is deleted by the arbitrary controller, and then, the control software is assigned to the arbitrary controller device; and further comprising display means for displaying, if the unnecessary control software is deleted, an indication that the unnecessary control software is not possessed by any controller device on the network.

17. A program supply medium for supplying a device operation management program for managing device operation on a network constructed by connecting thereto at least one controller device through a serial bus interface and by connecting thereto at least one controlled device to be controlled by the controller device, the medium comprising:

resource capacity check processing for checking a system resource capacity of the controller device, by a manager device which is determined so as to mange device operation, at initial setting when the network is constructed;

software capacity check processing for checking a capacity of control software for controlling the controlled device, by the manager device; and assignment processing for assigning the control software to the controller device, by the manager device, based on results of the resource capacity check processing and the software capacity check processing;

wherein if it is impossible to assign the control software to an arbitrary controller device, unnecessary control software possessed by the arbitrary controller device is assigned to another controller device by the manager device or is deleted by the arbitrary controller device, based on an instruction from the manager device, and then, the control software is assigned to the arbitrary controller device; and further comprising:

desired function determination processing for determining whether or not the control software controls a controlled device of a desired function, by the manager device;

possession determination processing for determining whether or not the arbitrary controller device possesses unnecessary control software, based on an instruction from the manager device, if the control software is determined to be of the controller device of the desired function as a result of determination made by the desired function determination processing; and possession possibility determination processing for determining whether or not another controller device can possess the unnecessary control software, by the manager device, if the arbitrary controller device is determined as possessing the unnecessary control software, as a result of determination made by the possession determination processing.

18. A program supply medium for supplying a device operation management program for managing device operation on a network constructed by connecting thereto at least one controller device through a serial bus interface and by connecting thereto at least one controlled device to be controlled by the controller device, the medium comprising:

resource capacity check processing for checking a system resource capacity of the controller device, by a manager device which is determined so as to mange device operation, at initial setting when the network is constructed;

software capacity check processing for checking a capacity of control software for controlling the controlled device, by the manager device; and assignment processing for assigning the control software to the controller device, by the manager device, based on results of the resource capacity check processing and the software capacity check processing;

wherein if it is impossible to assign the control software to an arbitrary controller device, unnecessary control software possessed by the arbitrary controller device is assigned to another controller device by the manager device or is deleted by the arbitrary controller device, based on an instruction from the manager device, and then, the control software is assigned to the arbitrary controller device; and wherein if the unnecessary control software is deleted, an indication that the unnecessary control software is not possessed by any controller device on the network is displayed on a display means of the arbitrary controller device.

19. A controller device connected to a network constructed by a serial bus interface, for controlling at least one controlled device to be controlled which is also connected to the network, wherein the controller device comprises memory means for possessing controller software for controlling the controlled device, and the controller device answers a capacity of the memory means to a manager device in response to an inquiry from the manager device which manages device operation on the network, and stores control software assigned by the manager device into the memory means;

wherein if it is impossible to assign the control software, the controller device deletes unnecessary control software stored in the memory means, based on an instruction from the manager device, and stores the control software into the memory means; and further comprising possession determination means for determining whether or not the unnecessary control software is stored in the memory means, based on an instruction from the manager device, if the control software is of a controlled device of a desired function.

20. A controller device connected to a network constructed by a serial bus interface, for controlling at least one controlled device to be controlled which is also connected to the network, wherein the controller device comprises memory means for possessing controller software for controlling the controlled device, and the controller device answers a capacity of the memory means to a manager device in response to an inquiry from the manager device which manages device operation on the network, and stores control software assigned by the manager device into the memory means;

wherein if it is impossible to assign the control software, the controller device deletes unnecessary control software stored in the memory means, based on an instruction from the manager device, and stores the control software into the memory means; and further comprising display means for displaying an indication that the unnecessary control software is not possessed by any controller device on the network, if the unnecessary control software is deleted.

* * * * *